United States Patent [19]

Wegele et al.

[11] Patent Number: 5,693,406

[45] Date of Patent: Dec. 2, 1997

[54] MULTI-PLY PAPER PRODUCT

[75] Inventors: George Vincent Wegele; Timothy Jude Lorenz, both of Cincinnati, Ohio

[73] Assignee: The Procter & Gamble Company, Cincinnati, Ohio

[21] Appl. No.: 519,472

[22] Filed: Aug. 25, 1995

[51] Int. Cl.$^6$ .............................. B32B 3/30; B32B 23/08; B32B 29/00

[52] U.S. Cl. .................... 428/179; 162/158; 428/507; 428/510; 428/511; 428/514; 428/535; 428/537.5

[58] Field of Search ..................... 428/534, 179, 428/507, 510, 511, 514, 535, 537.5; 162/158

[56] References Cited

U.S. PATENT DOCUMENTS

| | | | |
|---|---|---|---|
| 3,414,459 | 12/1968 | Wells | 161/131 |
| 3,867,225 | 2/1975 | Nystrand | 156/209 |
| 3,994,771 | 11/1976 | Morgan, Jr. et al. | 162/113 |
| 4,064,213 | 12/1977 | Lazorisak et al. | 264/134 |
| 4,501,640 | 2/1985 | Soerens | 162/111 |
| 4,528,316 | 7/1985 | Soerens | 524/503 |
| 4,994,146 | 2/1991 | Soerens | 162/112 |
| 5,143,776 | 9/1992 | Givens | 428/194 |
| 5,223,096 | 6/1993 | Phan et al. | 162/158 |
| 5,240,562 | 8/1993 | Phan et al. | 162/158 |
| 5,382,464 | 1/1995 | Ruppel et al. | 428/172 |
| 5,397,435 | 3/1995 | Ostendorf et al. | 162/112 |

FOREIGN PATENT DOCUMENTS

| | | | |
|---|---|---|---|
| 264 676 | 4/1988 | European Pat. Off. | D21H 1/02 |
| 95/08671 | 3/1995 | WIPO | D21H 27/40 |

*Primary Examiner*—D. S. Nakarani
*Attorney, Agent, or Firm*—Gerry S. Gressel; Larry L. Huston; E. Kelly Linman

[57] ABSTRACT

A multi-ply paper product. One or both of the plies may have embossments protruding towards and contacting the other ply. The plies are adhesively joined, preferably at such embossments. The adhesive is selected from a composition that advantageously provides a minimum wet ply bond strength and a dry ply bond strength which falls within a particularly desired range.

15 Claims, No Drawings

MULTI-PLY PAPER PRODUCT

FIELD OF THE INVENTION

The present invention relates to cellulosic fibrous structures such as paper products, and more particularly to paper products having multiple plies which are joined together.

BACKGROUND OF THE INVENTION

Paper products are well known in everyday life. Paper products are frequently referred to as tissue, and are used for paper toweling, facial tissue, and bath tissue.

Tissue paper products may comprise a single ply, but frequently comprise two or more plies. As used herein, a "ply" refers to a single sheet taken off a forming wire, or the equivalent thereof, and dried without additional fibers being added thereto.

Of course, a ply may be layered with different cellulosic fibers. Layering provides the benefits that a central layer may comprise relatively strong fibers to impart strength to the tissue paper product. Outboard of the central layer may be shorter fibers which impart a soft tactile sensation to the user. Layering may be advantageously accomplished by commonly assigned U.S. Pat. No. 3,994,771, issued Nov. 30, 1976 to Morgan, Jr. et al., which patent is incorporated herein by reference.

Frequently, two or more plies are joined together to make the paper product. Joining multiple plies together provides the advantage that the resulting laminate has a lesser bending modulus than a single ply of equivalent thickness. This provides the benefit that, again, a softer tactile sensation is perceived by the user. Absorbency and caliper are typically improved as well. Furthermore, joining three plies together allows the paper product to have different central and outboard plies in the laminate, to provide strength and softness respectively.

Multi-ply tissue products are typically cellulosic. As used herein, "cellulosic" refers to a paper product comprising at least about fifty weight percent or at least about fifty volume percent cellulosic fibers including, but not limited to, cotton linters, rayon, bagasse, and more preferably wood pulps, such as softwoods (gymnosperms or coniferous) or hardwoods (angiosperms or deciduous), which fibers may be recycled. The balance of the fibers may be synthetic, such as polyolefin or polyester.

Cellulosic plies are frequently joined together by the use of adhesive. Adhesive joining of cellulosic plies is advantageously described in commonly assigned U.S. Pat. No. 5,143,776, issued Sep. 1, 1992 to Givens, which patent is incorporated herein by reference.

However, adhesive joining of multiple cellulosic plies in a paper product can, and has, led to unsatisfactory performance. Particularly, paper products used as paper toweling, facial tissue, and bath tissue must have the proper ply bond strength. As used herein, "ply bond strength" refers to the force necessary to separate two adjacent plies from one another as described below.

Frequently tissue paper products, particularly paper toweling, are wetted in use. If the wet ply bond strength is insufficient, the plies separate in use and the paper product is destroyed. While it would seem an easy matter to simply increase the wet ply bond strength, the dry ply bond strength is directly coupled to the wet ply bond strength. In the prior art, as the wet ply bond strength increases to the proper level, the dry ply bond strength becomes too great. When the dry ply bond strength is too great, the softness and absorbency are typically reduced.

Accordingly it is an object of this invention to provide a multi-ply paper product. It is further an object of this invention to provide a multi-ply paper product having adequate wet ply bond strength without having a dry ply bond strength which is too great. Finally it is an object of this invention to provide such a paper product which is cellulosic and has the plies adhesively joined.

SUMMARY OF THE INVENTION

The invention comprises a multi-ply cellulosic paper product comprising at least two macroscopically monoplanar plies joined in face-to-face relationship. The paper product has a wet ply bond strength of at least 4.5 grams per inch, and preferably at least 5.0 grams per inch. The paper product further has a dry ply bond strength of 4.0 to 20.0 grams per inch, and preferably 5.0 to 15.0 grams per inch. One or more of the plies of the paper product may be embossed. The paper product may comprise two, three, or more plies. Thus, the paper product according to the present invention has decoupled wet ply bond strength and dry ply bond strength contrary to the prior art.

DETAILED DESCRIPTION OF THE INVENTION

The present invention comprises a laminate of two or more macroscopically monoplanar plies. The plies are cellulosic, as described above, and may be made according to the same manufacturing process, or according to different manufacturing processes.

Each ply may have a plurality of embossments protruding outwardly from the plane of the ply towards the adjacent ply. The adjacent ply likewise may have opposing protuberances protruding towards the first ply. If a three ply paper product is desired, the central ply may have embossments extending outwardly in both directions, although a central ply having no embossments or unidirectional embossments may be feasible.

The plies may be made according to commonly assigned U.S. Pat. No. 4,637,859, issued Jan. 20, 1987 to Trokhan; or U.S. Pat. No. 4,191,609, issued Mar. 4, 1980 to Trokhan, which patents are incorporated herein by reference. Alternatively, the plies may be conventionally dried using felts.

For the present invention, each ply may have a basis weight of about 8 to 30, and preferably 11 to 18 pounds per 3,000 square feet, and preferably has a composition of hardwood and/or softwood processed by any of the means well known in the art.

After the papermaking process which forms the ply is complete, either or both plies may be embossed. Embossing may be accomplished according to the knob-to-knob embossing process illustrated by commonly assigned U.S. Pat. No. 3,414,459, issued Dec. 3, 1968 to Wells; the nested embossing process illustrated in U.S. Pat. No. 3,556,907, issued Jan. 19, 1971 to Nystrand; or a dual ply process illustrated in commonly assigned U.S. Pat. No. 5,294,475, issued Mar. 15, 1994 to McNeil, all of which patents are incorporated herein by reference.

For the embodiments described and claimed herein, the embossments may prophetically be spaced on a pitch of 0.05 to 0.70 inches and may prophetically have an area at the distal end ranging from 0.001 to 0.100 square inches. Each embossment may prophetically be made on a roll having knobs which protrude 0 to 0.120 inches from the plane of the roll. The embossments may prophetically be round, oval shaped, or irregularly shaped.

The plies are preferably adhesively joined together. A suitable adhesive utilizes a polyvinyl alcohol adhesive made by fully hydrolyzing polyvinyl acetate and a thermosetting cationic resin. The resin may be a polyamide resin. The polyvinyl alcohol adhesive and cationic resin are provided in a 5 to 11 percent aqueous solution (i.e. 5 to 11 percent solids and 89 to 95 percent water), and preferably about a 5 to 8 percent aqueous solution (i.e., 5 to 8 percent solids and 92 to 95 percent water). Two to 6 percent of the total solution may comprise polyvinyl alcohol adhesive solids. At least one percent of the total solution comprises thermosetting cationic resin solids. All solution percentages are by weight.

The plies are preferably adhesively joined together. A suitable adhesive utilizes a fully hydrolyzed polyvinyl alcohol adhesive and a thermosetting cationic resin. The resin may be a polyamide resin. The polyvinyl alcohol adhesive and cationic resin are provided in an 89 to 95 percent aqueous solution, and preferably about a 92 to 95 percent aqueous solution (i.e., 92 to 95 percent water). Two to 6 percent of the total solution may comprise polyvinyl alcohol adhesive solids. At least one percent of the total solution comprises thermosetting cationic resin solids. All percentages are by weight.

A particularly preferred polyvinyl alcohol is Elvanol 71-30, supplied from the DuPont Corporation of Wilmington, Del. A particularly preferred thermosetting cationic polyamide resin is Kymene 557H, supplied by the Hercules Corporation of Wilmington, Del., although Kymene LX may be suitable, as well as other thermosetting cationic resins.

By way of nonlimiting example, the adhesive composition may comprise a polyvinyl alcohol solution containing ten percent solids, and a Kymene 557H solution containing 12.5 percent solids. Tap water supplied at ambient temperature is also provided. The adhesive is then made, in order from 40 parts polyvinyl alcohol adhesive, 8 parts Kymene 557H, and 52 parts water. These constituents are added together in this order in a suitable container and mixed for roughly ten minutes using an impeller type mixture. Preferably the pH of the mixture is at least 7.0, to yield a proper cure rate.

This example provides an adhesive composition having five percent total solids, of which one percent is Kymene and four percent is a polyvinyl alcohol adhesive. The adhesive may be applied to a ply at a total solids quantity of 3 to 85 grams per 3,000 square feet, preferably 4 to 48 grams per 3,000 square feet, and more preferably 6 to 20 grams per 3,000 square feet. For an adhesive composition having a constant amount total solids, as the amount of thermosetting cationic resin making up the constant total solids increases, generally a lesser quantity of the adhesive composition may be applied to the ply. Alternatively stated, for a constant percentage of thermosetting cationic resin relative to the polyvinyl alcohol adhesive, as the quantity of total solids in the adhesive composition increases, the quantity of total solids applied to the ply generally increases.

A three-roll adhesive application system may be used to apply the adhesive. Using this system, adhesive is picked up as a film on the surface of a pickup roll. The adhesive film is then split in the nip between the pickup roll and a metering roll. The portion of the film remaining on the metering roll then transfers to an applicator roll where the adhesive film is again split. The film remaining on the applicator roll is applied to the embossments of the ply. The embossments of this ply are then brought in contact with another ply. The plies are adhesively joined together in the nip of conventional marrying rolls.

Of course, the adhesive may be applied to the embossments in any other manner as are well known in the art and is commonly used for nested or knob-to-knob embossing processes as well. Suitable adhesive application systems include flexographic, spray systems, gravure systems, as well as the three-roll system described above.

As the spacing and size of the protuberance decreases, a greater amount of adhesive may be applied to each protuberance for the embodiment described. The amount of adhesive may be increased either by using a relatively greater adhesive solids content in the adhesive composition, or by applying a larger quantity of the adhesive composition to the ply.

The resulting paper product according to the present invention comprises a laminate of two or more plies. The paper product according to the present invention has a wet ply bond strength of at least 4.5 grams per inch, and more preferably at least 5.0 grams per inch.

Preferably the paper product according to the present invention further has a alkaline wet ply bond strength of at least 4.5, and more preferably at least 5.0 grams per inch. Alkaline wet ply bond strength provides the benefit that if the paper product according to the present invention is used with certain commercially available cleaning products, the plies will remain joined together as a unitary laminate.

The resulting paper product also has a dry ply bond strength of 4.0 to 20.0 grams per inch, and more preferably 5.0 to 15.0 grams per inch. Wet and dry ply bond strengths are measured as follows.

Dry Ply Bond Strength

Samples of four finished paper products are provided. One three inch strip running the entire length of the sample is cut from the center of each sample. Two of the strips are cut in the machine direction and the other two are cut in the cross machine direction (i.e., between perforations in the machine direction or between edges in the cross machine direction). The strips are separated slightly along either of the three inch edges, so that each ply is available independent of the other. The plies are manually separated until the sample has a gage length of two inches.

Each ply is placed in the jaw of a tensile machine. A suitable tensile tester is a Model 1451-24 supplied by the Thwing/Albert Corporation of Philadelphia, Pa. The crosshead separation speed is set at 20 inches per minute and travels 7.5 inches from an initial separation of 2.0 inches. Data is only recorded for the last six inches of crosshead travel. All four samples are tested in tension. The four numbers are then averaged to give a single ply bond strength representative of the product from which all four samples were taken.

Care must be taken that the portion of the sample yet to be separated by the tensile machine does not contact the lower jaw or the lower crosshead of the tensile machine. If such contact occurs, it will register on the load cell and give a reading which is erroneously high. Similarly, care must be taken that the portion of the sample yet to be separated does not contact the portion of the sample having the plies already separated by the tensile tester. If such contact occurs, it will falsely increase the apparent ply bond strength. If either of the aforementioned contacts occur, the data point is to be discarded and a new sample tested.

Wet Ply Bond Strength

A single sample of the paper product is provided. The sample is aged at least two weeks after converting, that is, after application of the adhesive and joining of the plies, in order to allow adequate cure time for the adhesive composition.

A three inch strip is cut from the center of the sample in the machine direction. The strip runs the entire machine direction length of the sample (e.g., between perforations).

The plies are separated along one of the three inch edges of the sample. The portion of the sample which has not been separated, i.e., the portion which is not to be placed in the jaws of the tensile machine, is immersed in distilled water. After immersion, the sample is immediately removed from the water and allowed to drain for 60 seconds on a draining rack. The draining rack is provided with a nylon wire square mesh. The wires forming the mesh are 0.015 inches diameter on a pitch of 0.25 inches. The drying rack is oriented at an angle of 45 degrees relative to the horizontal. While drying on the drying rack, the sample is oriented so that the longer edges of the sample are downwardly aligned with the slope of the drying rack. The separated edges of the ply are brought back together in the drying rack so that the sample is as smooth as possible, and the sample properly drains excess water. After having been prepared in this manner, the sample is then tested in the tensile machine as described above for the dry ply bond strength.

A nonlimiting example of one paper product made according to the present invention is illustrated below. The paper products made from two plies of cellulosic fibers as is commonly used in Bounty brand paper towels marketed by The Procter & Gamble Company of Cincinnati, Ohio and the assignee of the present invention. Each ply was made of 65 percent northern softwood Kraft, 35 percent CTMP, and has a basis weight of 14 pounds per 3,000 square feet. Each ply was embossed in a nested embossing process by elliptically shaped protuberances having at the distal end a major axis of 0.076 inches, a minor axis of 0.038 inches and a protuberance height of 0.070 inches. The protuberances are spaced in a two/three complementary concentric diamond pattern on a 45 degree pitch of about 0.118 inches. The protuberances comprise about 10 percent of the area of each ply. Two complementary plies were made and joined together at a zero clearance marrying nip, so that a unitary laminate having 42±3 protuberances per square inch per ply was formed.

An adhesive composition, prepared as described above, was applied to the protuberances of one ply. The total solids of the adhesive composition was applied to the paper product in a quantity of about 8 grams per 3,000 square feet using a three roll system. The resulting paper product had a wet ply bond strength of 5.4 grams per inch and a dry ply bond strength of 9.1 grams per inch.

In Table I paper products according to the present invention is compared to other commercially available paper towels.

This sample according to the present invention was made using a five percent total solids adhesive composition and was aged two weeks after convening. A second sample according to the present invention utilized a six percent total solids composition and was aged for three weeks after converting.

TABLE I

| BRAND | COMPANY/PLANT | WET PLY BOND STRENGTH | DRY PLY BOND STRENGTH |
|---|---|---|---|
| Present Invention | Assignee | 5.4 | 9.1 |
| Present Invention | Assignee | 6.0 | 11.7 |
| Bounty | Assignee | 3.7 | 14.7 |
| Brawny | James River | 3.1 | 10.1 |
| Sparkle | Georgia Pacific | 3.0 | 7.0 |
| Mardis Gras | Ft. Howard | 3.4 | 7.6 |
| Viva 2-ply | Scott | 3.0 | 4.4 |
| Hi-Dri | Kimberly Clark | 3.4 | 5.5 |

Each of the wet and dry ply bond strengths in Table I represents an average of five samples. Of course, for the dry ply bond strength test, each of the five samples represents an average of our test specimens.

Variations in the disclosed structure are feasible. For example, prophetically one of the plies may be embossed and the other ply not embossed. Alternatively, and prophetically neither ply may be embossed. In this embodiment, the two plies are joined together by discrete or continuous deposits of adhesive. Both the adhesively joined areas and the non-adhesively joined areas of each ply would lie within the plane of that ply.

It will be apparent to one skilled in the art that other embodiments and executions are feasible, all of which are within the scope of the appended claims.

What is claimed is:

1. A multi-ply cellulosic paper product, said multi-ply paper product comprising at least a first ply, and an adjacent second ply, each of said plies having first and second sides, one of said sides of said first ply joined to one of said sides of said second ply, at least one of said plies having embossments thereon, said embossments extending outwardly from the plane of said ply towards and contacting said adjacent ply, said plies being joined to one another at said embossments, said paper product having a wet ply bond strength of at least 4.5 grams per inch, and a dry ply bond strength of 4.0 to 20.0 grams per inch.

2. A paper product according to claim 1 having a wet ply bond strength of at least 5.0 grams per inch.

3. A paper product according to claim 1 wherein said dry ply bond strength is 5.0 to 15.0 grams per inch.

4. A paper product according to claim 2 or 3 wherein said plies are joined using an aqueous adhesive composition comprising 5 to 11 wt. % solids and 89 to 95 wt. % water, wherein said solids comprises a polyvinyl alcohol made by fully hydrolyzing polyvinyl acetate.

5. A paper product according to claim 4 wherein said adhesive composition further comprises a thermosetting cationic resin.

6. A paper product according to claim 5 wherein each said ply has said embossments, said embossments contacting said adjacent ply.

7. A paper product according to claim 6 wherein said adhesive composition is applied to said embossments of at least one of said plies.

8. A paper product according to claim 4 comprising 6 to 20 grams of solids of said adhesive composition per 3,000 square feet of paper product.

9. A paper product according to claim 4 having three plies.

10. A multi-ply cellulosic paper product comprising three plies, the three plies comprising a central ply disposed between two outboard plies, each said outboard ply having embossments, said embossments contacting said central ply, and said paper product having a wet ply bond strength of at least 4.5 grams per inch, and a dry ply bond strength of 4.0 to 20.0 grams per inch.

11. A multi-ply cellulosic paper product, said multi-ply paper product comprising at least a first ply, and an adjacent second ply, each of said plies having first and second sides, one of said sides of said first ply joined to one of said sides of said second ply, said paper product having a wet ply bond strength of at least 4.5 grams per inch, and a dry ply bond strength of 4.0 to 20.0 grams per inch.

12. A paper product according to claim 11 having a wet ply bond strength of at least 5.0 grams per inch.

13. A paper product according to claim 12 comprising at least three plies.

14. A paper product according to claim 11 wherein said dry ply bond strength is 5.0 to 15.0 grams per inch.

15. A paper product according to claim 14 comprising at least three plies.

* * * * *

UNITED STATES PATENT AND TRADEMARK OFFICE
CERTIFICATE OF CORRECTION

PATENT NO. : 5,693,406

DATED : December 2, 1997

INVENTOR(S) : GEORGE VINCENT WEGELE et al.

It is certified that error appears in the above-identified patent and that said Letters Patent is hereby corrected as shown below:

Column 3, lines 13-23, delete "The plies are preferably......are by weight.".

Column 5, line 64, "convening." should read -- converting. --.

Column 6, line 18, "our" should read -- four --.

Signed and Sealed this

Eighth Day of September, 1998

BRUCE LEHMAN

Attest:

Attesting Officer

Commissioner of Patents and Trademarks